(12) United States Patent
Smith

(10) Patent No.: US 10,135,230 B1
(45) Date of Patent: Nov. 20, 2018

(54) ELECTRICAL CONNECTOR WITH REMOVABLE SPACER

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

(*) Notice: Subject to any disclaimer, the term of this patent is extended or adjusted under 35 U.S.C. 154(b) by 0 days.

(21) Appl. No.: 15/667,133

(22) Filed: Aug. 2, 2017

Related U.S. Application Data

(63) Continuation-in-part of application No. 15/584,547, filed on May 2, 2017.

(51) Int. Cl.
  *H02G 3/06* (2006.01)

(52) U.S. Cl.
  CPC .................. *H02G 3/0616* (2013.01)

(58) Field of Classification Search
  CPC ........... H02G 3/22; H02G 9/06; H02G 3/0616
  USPC ................................. 174/68.1, 650
  See application file for complete search history.

(56) References Cited

U.S. PATENT DOCUMENTS

| | | | |
|---|---|---|---|
| 5,355,109 A | 10/1994 | Yamazaki | |
| D408,790 S | 4/1999 | Kiely et al. | |
| 6,840,782 B1 | 1/2005 | Borden et al. | |
| 6,881,901 B2 | 4/2005 | Egan | |
| 7,078,623 B1 * | 7/2006 | Sheehan | H02G 3/0616 174/135 |
| 7,182,611 B2 | 2/2007 | Borden et al. | |
| D626,087 S | 10/2010 | Kiely | |
| D633,873 S | 3/2011 | Kiely | |
| 7,901,256 B1 | 3/2011 | Kiely | |
| 7,915,545 B1 | 3/2011 | Bixler et al. | |
| 7,927,157 B1 | 4/2011 | Kiely | |
| D648,281 S | 11/2011 | Cerasale | |
| D651,569 S | 1/2012 | Kiely | |
| 8,106,297 B1 | 1/2012 | Kiely | |
| D657,316 S | 4/2012 | Kiely | |
| 8,231,392 B2 | 7/2012 | Garvin | |
| D666,154 S | 8/2012 | Kiely | |
| 8,410,378 B1 | 4/2013 | Senseney et al. | |
| 8,419,449 B1 | 4/2013 | Smith | |
| D703,519 S | 4/2014 | Senseney et al. | |
| 8,809,680 B2 | 8/2014 | Kiely | |
| D721,652 S | 1/2015 | Smith | |
| D722,966 S | 2/2015 | Smith | |
| 9,000,310 B2 | 4/2015 | Smith | |

(Continued)

*Primary Examiner* — Dhiru R Patel
(74) *Attorney, Agent, or Firm* — Ware, Fressola, Maguire & Barber LLP

(57) ABSTRACT

An electrical connector for receipt of EMT or rigid conduit has a body with first and second body portions, the first portion having a hollow interior with an inner smooth cylindrical surface having a radius of curvature dimensioned for receipt of a rigid electrical conduit, a removable spacer having an inner smooth surface with a radius of curvature substantially corresponding to a radius of curvature of an outer surface of an EMT, the removable spacer also having an outer surface corresponding to the inner smooth cylindrical surface of the first body portion, and wherein the second body portion forms a stop adjacent the second end of the first body portion so as to contact a terminating end of a rigid conduit or EMT. The second body portion has a central bore for the passage of electrical conductors.

7 Claims, 6 Drawing Sheets

(56) References Cited

U.S. PATENT DOCUMENTS

| | | |
|---|---|---|
| 9,012,791 B2 | 4/2015 | Smith |
| D733,064 S | 6/2015 | Smith |
| D749,047 S | 2/2016 | Smith |
| 9,257,795 B2 | 2/2016 | Smith |
| 2013/0089994 A1 | 4/2013 | Smith |
| 2013/0133943 A1 | 5/2013 | Smith et al. |
| 2014/0339824 A1 | 11/2014 | Kang |
| 2015/0053476 A1 | 2/2015 | Smith |
| 2015/0053477 A1 | 2/2015 | Smith |
| 2016/0240287 A1 | 8/2016 | Thomas |

\* cited by examiner

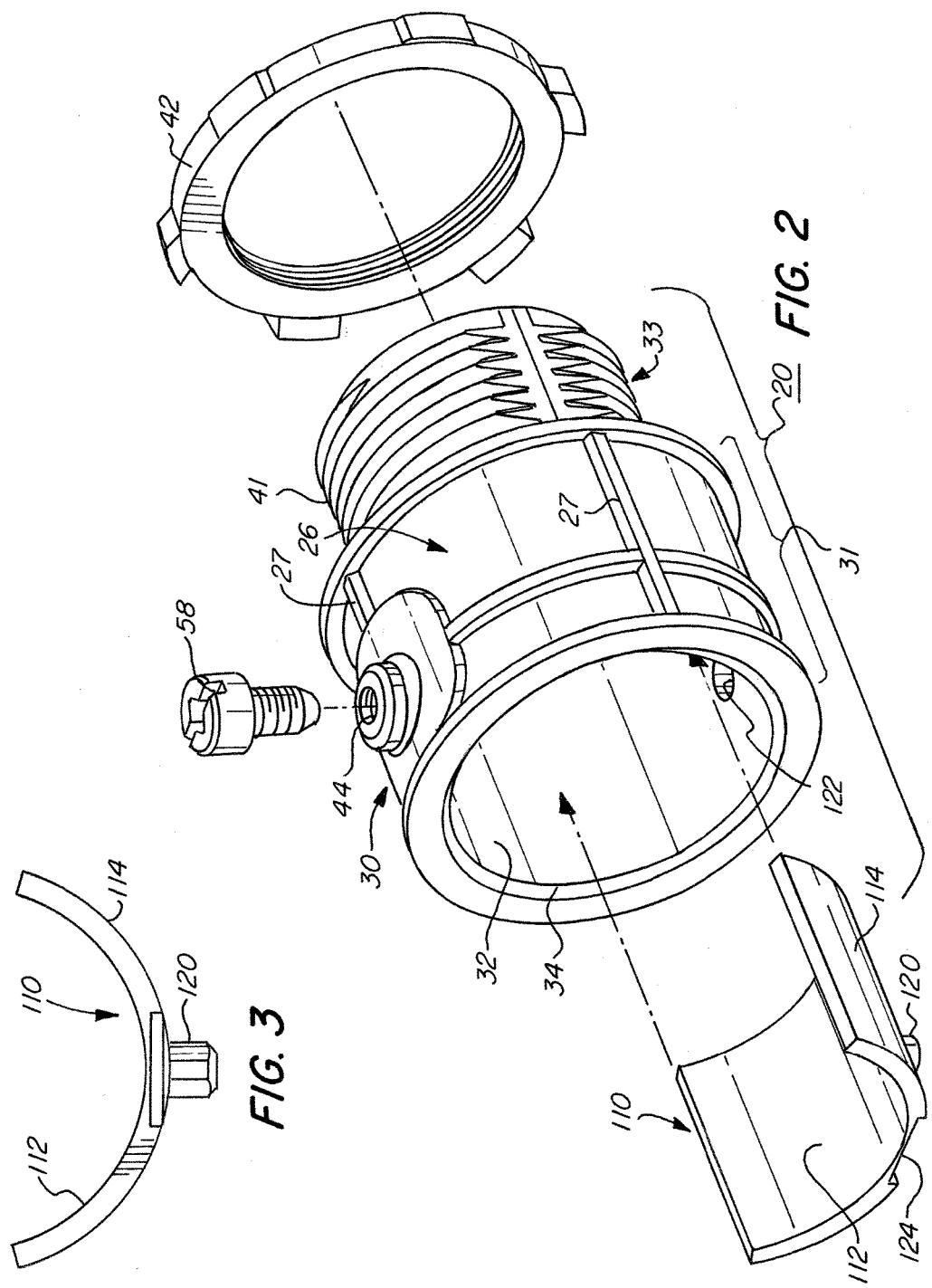

ELECTRICAL CONNECTOR WITH REMOVABLE SPACER

CROSS REFERENCE TO RELATED APPLICATION

This application is a continuation-in-part of patent application number 15/584,547 filed on May 2, 2017, now abandoned which application is hereby incorporated by reference in its entirety. This continuation-in-part application is claiming domestic priority under all applicable sections of 35 U.S.C. § 120.

TECHNICAL FIELD

The present invention relates to the field of electrical connectors.

BACKGROUND OF THE INVENTION

Electrical connectors are electrical fittings that are typically installed at the end of an electrical conduit, including electrical metallic tubing (EMT) and rigid electrical conduit. The electrical connector typically has a portion dimensioned for insertion into a knockout hole of an electrical panel box or the like. Electrical conductors within an EMT or rigid conduit are typically connected to components within the electrical panel box.

It is known in the industry that various trade sizes for EMT and rigid conduit ostensibly having the same outer diameter (OD) may nevertheless have significant variations in the OD especially between EMT and rigid conduit having the same trade size, particularly for trade sizes of two inches and below. Such EMT and rigid conduit are used in various electrical installations.

Because of the trade size variation in OD between EMT and rigid conduit, there has been a need for an electrical fitting which can accommodate the variation in the OD for EMT and rigid conduit for the same trade size. This can reduce the number of electrical fittings needed by an electrician when installing rigid conduit or EMT.

SUMMARY OF THE INVENTION

The present invention relates to an electrical connector for receipt of an electrical metallic tubing (EMT) or a rigid electrical conduit, comprising a body having a first body portion and a second body portion, the first body portion having a first end and a second end, and a hollow interior extending from the first end to the second end with an inner smooth cylindrical surface having a radius of curvature dimensioned for receipt of a rigid electrical conduit, and a threaded hole extending through the first body portion to the hollow interior, the threaded bore dimensioned for receipt of a screw so as to secure a rigid electrical conduit or an electrical metallic tubing (EMT) received in said hollow interior, a removable spacer having a shape that is a section of a cylinder, the removable spacer having an inner smooth surface with a radius of curvature substantially corresponding to a radius of curvature of an outer surface of an EMT, the removable spacer also having an outer smooth surface corresponding to the radius of curvature of the inner smooth cylindrical surface of the first body portion, and wherein the second body portion of the body is integrally formed at the second end of the first body portion so as to form a stop adjacent the second end of the first body portion, the stop dimensioned to contact a terminating end of a rigid electrical conduit or EMT received in the first body portion, the second body portion having a central bore for the passage of electrical conductors associated with a rigid electrical conduit or EMT secured to the first body portion, and also having a threaded outer surface for receipt of a locknut.

Another embodiment of the present invention is the electrical connector as described above, wherein the removable spacer includes a post extending from the outer surface of the removable spacer, the post dimensioned for insertion into an aperture formed in the inner smooth cylindrical surface of the first body portion.

Another embodiment of the present invention is the electrical connector as described above, wherein the aperture passes through the first body portion.

A further embodiment of the present invention is the electrical connector as described above, wherein the removable spacer further includes a slot formed therein dimensioned for insertion of a tool between the removable spacer and the inner smooth cylindrical surface of the first body portion so as to assist in removal of the spacer from the body.

A further embodiment of the present invention is the electrical connector as described above, wherein the removable spacer further includes a slot formed therein dimensioned for insertion of a tool between the removable spacer and the inner smooth cylindrical surface of the first body portion so as to assist in removal of the spacer from the body.

BRIEF DESCRIPTION OF THE DRAWINGS

For a further understanding of the nature and objects of the present invention, reference is made to the following detailed description in conjunction with following drawings in which:

FIG. 2 is an exploded front perspective view of the electrical connector with removable spacer shown in FIG. 1, with the spacer removed.

FIG. 3 is a front view of the removable spacer.

DETAILED DESCRIPTION

Figure 1:
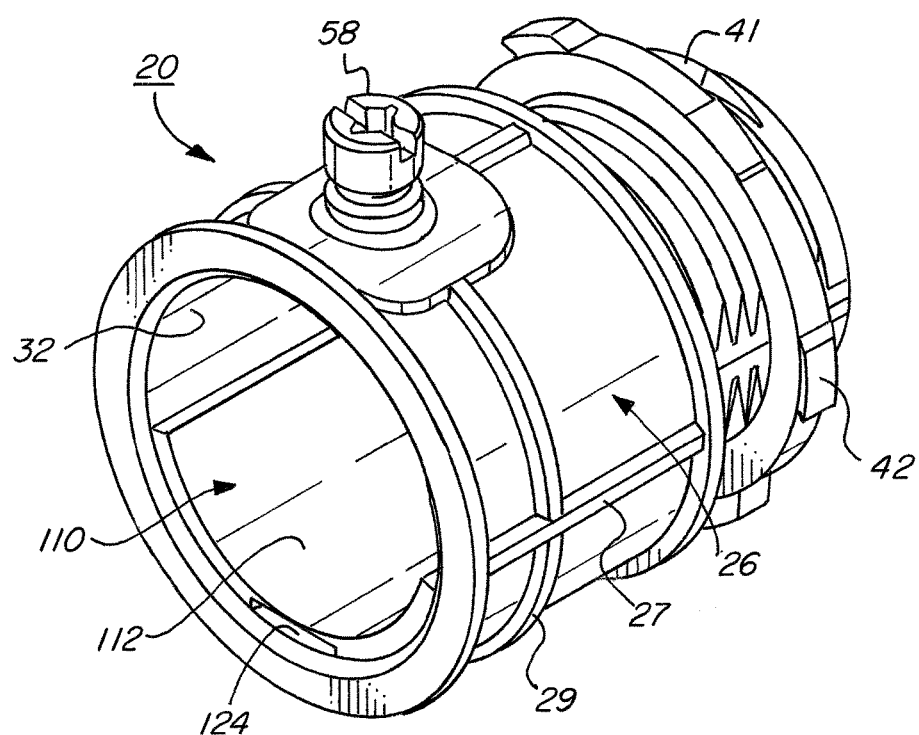
FIG. 1 is a front perspective view of an embodiment of an electrical connector with a removable spacer according to the present invention.
Figure 4:
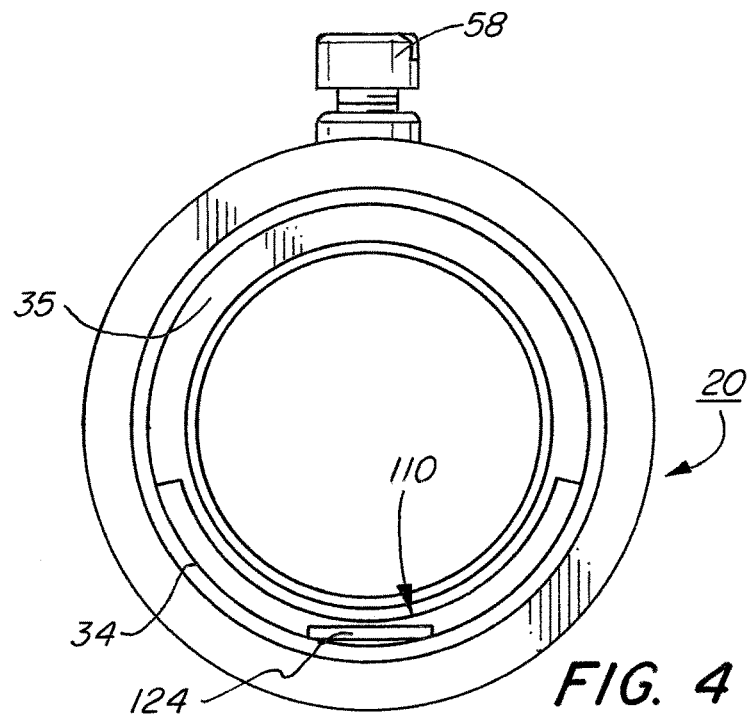
FIG. 4 is a front view of the electrical connector.
Figure 5:
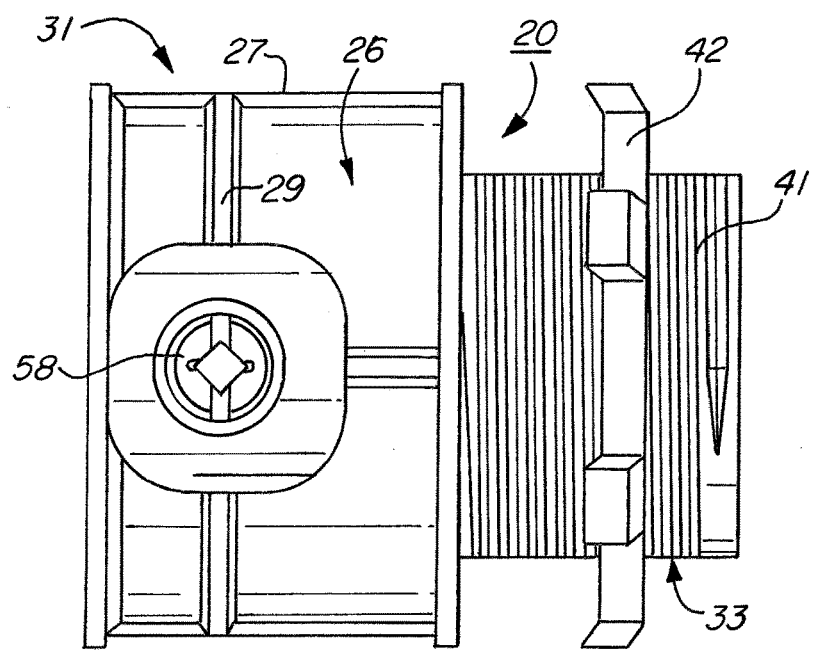
FIG. 5 is a top view of the electrical connector.
Figure 6:
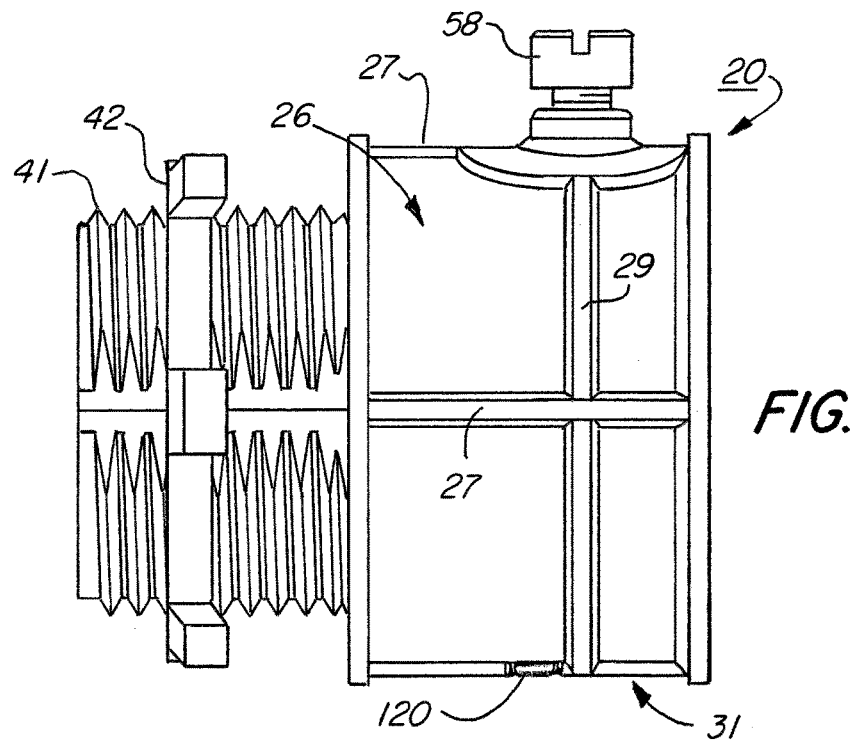
FIG. 6 is a left side view of the electrical connector.
Figure 7:
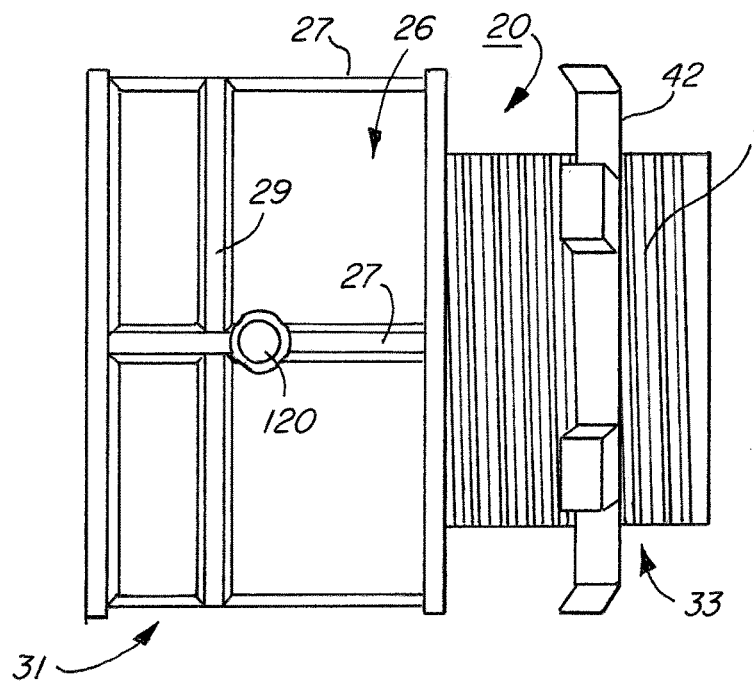
FIG. 7 is a bottom view of the electrical connector.
Figure 8:
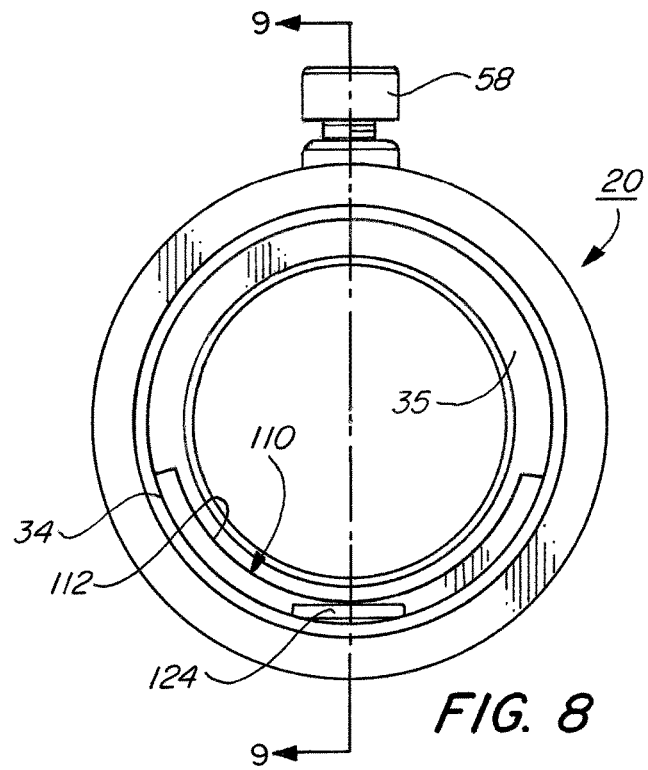
FIG. 8 is a front view of the electrical connector with an EMT thin wall conduit installed.
Figure 9:
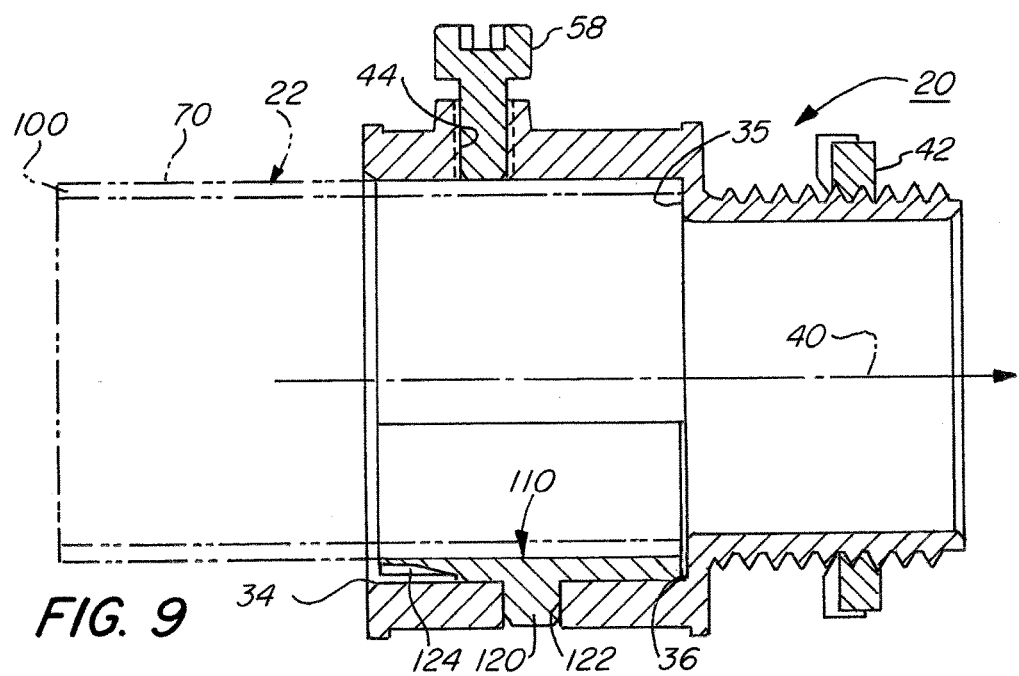
FIG. 9 is a cross-section view of the electrical connector with the EMT installed taken along line 9-9 of FIG. 8.
Figure 10:
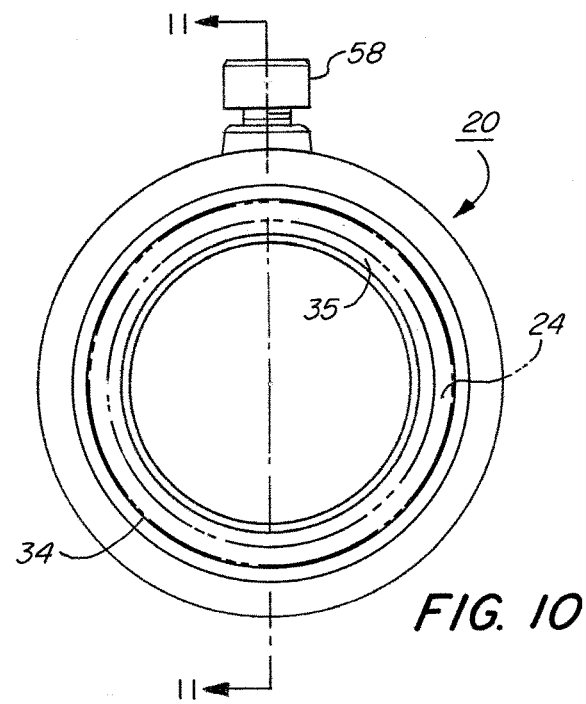
FIG. 10 is a front view of the electrical connector with a rigid conduit installed.
Figure 11:
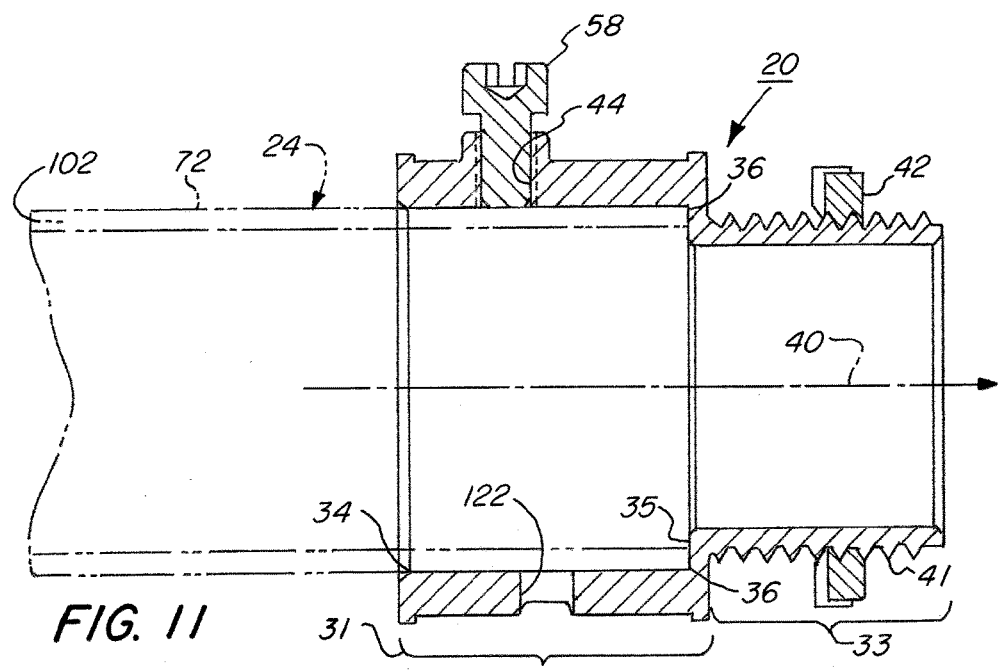
FIG. 11 is a cross-sectional view of the electrical connector with a rigid conduit installed taken along line 11-11 of FIG. 10.

As seen in FIGS. 1 and 2, an electrical connector 20 according to an embodiment of the present invention is designed to receive an end 23 of an electrical metallic tubing (EMT) 22 as seen in FIGS. 8 and 9 using removable spacer 110, as well as to receive an end 25 of a rigid electrical conduit 24 as seen in FIGS. 10 and 11. It is known in the industry that EMT's are typically thin walled as compared to the wall thickness of comparably sized rigid conduit.

As best seen in FIGS. 1-3, the electrical connector has a body 30 which is typically zinc die cast. The body can also be fabricated from other electrically conductive materials, such as steel or aluminum. The body is generally cylindrical in shape with a first portion 31 and a second portion 33. The first portion has an outer surface 26 that may have longitudinal ribs 27 and circumferential ribs 29. The first portion 31 has an inner smooth cylindrical surface 32 that is threadless (no internal threads) having a radius of curvature dimensioned for receipt of a rigid electrical conduit 24 (see FIG. 11). The inner smooth cylindrical surface extends inwardly from a first end 34 of the first portion to a second end 36 of the first portion sufficient to secure an end of an EMT or rigid conduit.

The body also has a second portion 33 with a central bore 40 (see arrow 40—FIGS. 9 and 11) for the passage of conductors therethrough associated with the EMT or rigid conduit to which the electrical connector is attached. The second portion has an internal ridge 35 that forms a stop to an EMT or rigid conduit inserted into first portion 31. As seen in FIGS. 9 and 11, the second portion 33 is preferably integrally formed with first portion 30 at second end 36 of first portion 31. Threads 41 are on the outer surface of second portion 33 and are dimensioned for receipt of a locknut 42 as seen in FIGS. 1 and 2. Second portion 33 has a cylindrical shape dimensioned for insertion into a knockout hole of an electrical panel box (not shown) or the like. Once inserted into the knockout hole, the electrical connector is secured to the panel box (or the like) by tightening locknut to the second portion.

The first portion of body 30 includes a threaded hole 44 passing through the body for receipt of screw 58. As seen in FIGS. 9 and 11, this screw helps secure an EMT or rigid conduit to the electrical connector.

As can best be seen in FIGS. 8 and 9 for an EMT and FIGS. 10 and 11 for a rigid conduit, the EMT typically has a thinner wall thickness 100 as compared to the wall thickness 102 of the rigid conduit 24. For trade sizes two inches or less, the OD of EMT is typically less than the OD for a comparable rigid conduit.

The present invention as seen in FIGS. 1-3 and 8-11 addresses this problem in the art since the electrical connector further including a removable spacer 110. This removable spacer when secured to the first portion 31 of body 30, allows the electrical connector to make secure contact with the outer surface 70 of the EMT as best seen in FIG. 9.

For securement of the electrical connector to a rigid conduit as seen in FIGS. 10 and 11, the removable spacer is removed; thereby allowing the electrical connector to accommodate the larger OD and thus the radius of curvature of outer surface 72 of the rigid conduit as compared to the OD and thus the radius of curvature of outer surface 70 of the comparably sized EMT 22. As best seen in FIGS. 2 and 3, the removable spacer has a shape that is a section of a cylinder, the removable spacer having an inner smooth surface 112 with a radius of curvature substantially corresponding to the radius of curvature of the outer surface 70 of the EMT (see FIG. 9). The removable spacer has an outer surface 114 corresponding to a radius of curvature of the inner smooth cylindrical surface 32 of the first portion 31 of electrical connector 20 (see FIG. 2). Thus, the removable spacer accommodates a space between the outer surface 70 of the EMT and the inner surface 32 of the first portion 31; thereby providing a snug fitment of the electrical connector onto the EMT as shown in FIGS. 8 and 9.

The shape of the removable spacer can vary as long as it accommodates the space between outer surface 70 of the EMT and inner surface 32 of the first portion 31 of electrical connector 20. Of course, the removable spacer can also be used to accommodate variation in OD's that may occur from sample to sample of EMT or from sample to sample of rigid conduit. Such sample OD variation is more common in larger trade size (greater than 2½" OD) EMT and rigid conduit.

To facilitate securement of the removable spacer 110 to the electrical connector, the removable spacer includes a post 120 as best seen in FIGS. 2, 3 and 9. This post is positioned on the outer surface 114 of the removable spacer so as to pass into an aperture 122 of the first portion. The aperture may extend through the first portion to outer surface 26.

The removable spacer also includes a slot 124 as best seen in FIGS. 1, 2 and 9. The slot provides for easy insertion of a tool, such as the blade of a screwdriver (not shown), so as to remove the removable spacer before installation of the electrical connector onto a rigid conduit or the like, where the outer diameter of the rigid conduit requires the full diameter of the electrical connector in order to secure the electrical connector to the rigid conduit. This is best seen in FIGS. 10 and 11. The removable spacer is fabricated from metal, such as zinc alloy, although it may also be fabricated from other metals.

Of course, other means of attaching the removable spacer to the electrical connector could be used, such as a press fitment or the like without the use of a post. Variations in the removable spacer can also be made to facilitate removal of the removable spacer from the electrical connector if desired, such as elimination of the slot and providing for flexible bending of the removable spacer so as to facilitate removal from the electrical connector.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electrical connector for receipt of an electrical metallic tubing (EMT) or a rigid electrical conduit, comprising:

a body formed from an electrically conductive material, the body having a first body portion and a second body portion, the first body portion having a first end and a second end, and a hollow interior extending from the first end to the second end with an inner smooth cylindrical surface having a radius of curvature dimensioned for receipt of a rigid electrical conduit, and a threaded hole extending through the first body portion to the hollow interior, the threaded hole dimensioned for receipt of a screw so as to secure a rigid electrical conduit or an electrical metallic tubing (EMT) received in said hollow interior;

a removable spacer fabricated from metal, the removable spacer having a shape that is a section of a cylinder, the removable spacer having an inner smooth surface with a radius of curvature substantially corresponding to a radius of curvature of an outer surface of the EMT, the removable spacer also having an outer smooth surface having a radius of curvature substantially corresponding to the radius of curvature of the inner smooth cylindrical surface of the first body portion so that the removable spacer makes secure contact with the outer surface of the EMT; and wherein the second body portion of the body is integrally formed at the second end of the first body portion, the second body portion having an internal ridge that forms a stop adjacent the second end of the first body portion, the stop dimensioned to contact a terminating end of the rigid electrical conduit or the EMT received in the first body portion, the second body portion having a central bore for the passage of electrical conductors associated with the rigid electrical conduit or the EMT secured to the first body portion, and also having a threaded outer surface for receipt of a locknut.

2. The electrical connector according to claim 1, wherein the removable spacer includes a post extending from the outer surface of the removable spacer, the post dimensioned for insertion into an aperture formed in the inner smooth cylindrical surface of the first body portion.

3. The electrical connector according to claim 2, wherein the aperture passes through the first body portion.

4. The electrical connector according to claim 3, wherein the removable spacer further includes a slot formed therein dimensioned for insertion of a tool between the removable spacer and the inner smooth cylindrical surface of the first body portion so as to assist in removal of the spacer from the body.

5. The electrical connector according to claim 1, wherein the removable spacer further includes a slot formed therein dimensioned for insertion of a tool between the removable spacer and the inner smooth cylindrical surface of the first body portion so as to assist in removal of the spacer from the body.

6. The electrical connector according to claim 1, wherein the removable spacer metal is zinc alloy.

7. The electrical connector according to claim 1, wherein the body is zinc die cast.

* * * * *